United States Patent
Chang et al.

(10) Patent No.: US 11,317,346 B2
(45) Date of Patent: Apr. 26, 2022

(54) COMMUNICATION SYSTEM

(71) Applicant: Advanced Semiconductor Engineering, Inc., Kaohsiung (TW)

(72) Inventors: Hsu-Ruey Chang, Kaohsiung (TW); Yu-Yang Ding, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 382 days.

(21) Appl. No.: 16/280,862

(22) Filed: Feb. 20, 2019

(65) Prior Publication Data

US 2020/0267649 A1   Aug. 20, 2020

(51) Int. Cl.
| | | |
|---|---|---|
| H04W 52/02 | (2009.01) | |
| H04W 4/44 | (2018.01) | |
| H04L 7/00 | (2006.01) | |
| H04L 5/16 | (2006.01) | |

(52) U.S. Cl.
CPC ......... *H04W 52/0229* (2013.01); *H04W 4/44* (2018.02)

(58) Field of Classification Search
None
See application file for complete search history.

(56) References Cited

U.S. PATENT DOCUMENTS

| | | | | |
|---|---|---|---|---|
| 8,391,416 | B1* | 3/2013 | Snodgrass | H04J 1/065 |
| | | | | 375/316 |
| 2011/0064420 | A1* | 3/2011 | Rajagopal | H04B 10/1125 |
| | | | | 398/154 |
| 2015/0341875 | A1* | 11/2015 | Kwak | H04W 56/001 |
| | | | | 370/350 |
| 2016/0219491 | A1* | 7/2016 | Sakurai | H04W 52/0245 |
| 2018/0019865 | A1* | 1/2018 | Lee | H04J 3/0685 |

FOREIGN PATENT DOCUMENTS

| | | | | |
|---|---|---|---|---|
| CN | 107507317 A | * | 12/2017 | |
| CN | 108860386 A | * | 11/2018 | |
| CN | 105530690 B | * | 2/2019 | ......... H04L 5/0053 |
| CN | 106685476 B | * | 2/2019 | |
| CN | 210011725 U | * | 2/2020 | |
| WO | WO-9749201 A1 | * | 12/1997 | ........ H04W 56/0085 |

* cited by examiner

*Primary Examiner* — Mohammed Rachedine
(74) *Attorney, Agent, or Firm* — Foley & Lardner LLP

(57) ABSTRACT

A communication system includes a transmitting module. The transmitting module is configured to send at least one preamble to a receiver module operating alternatively in an idle mode or a transmission mode during a synchronization time period (Tsync). The synchronization time period (Tsync) is greater than an idle time period of the idle mode of the receiving module.

26 Claims, 12 Drawing Sheets

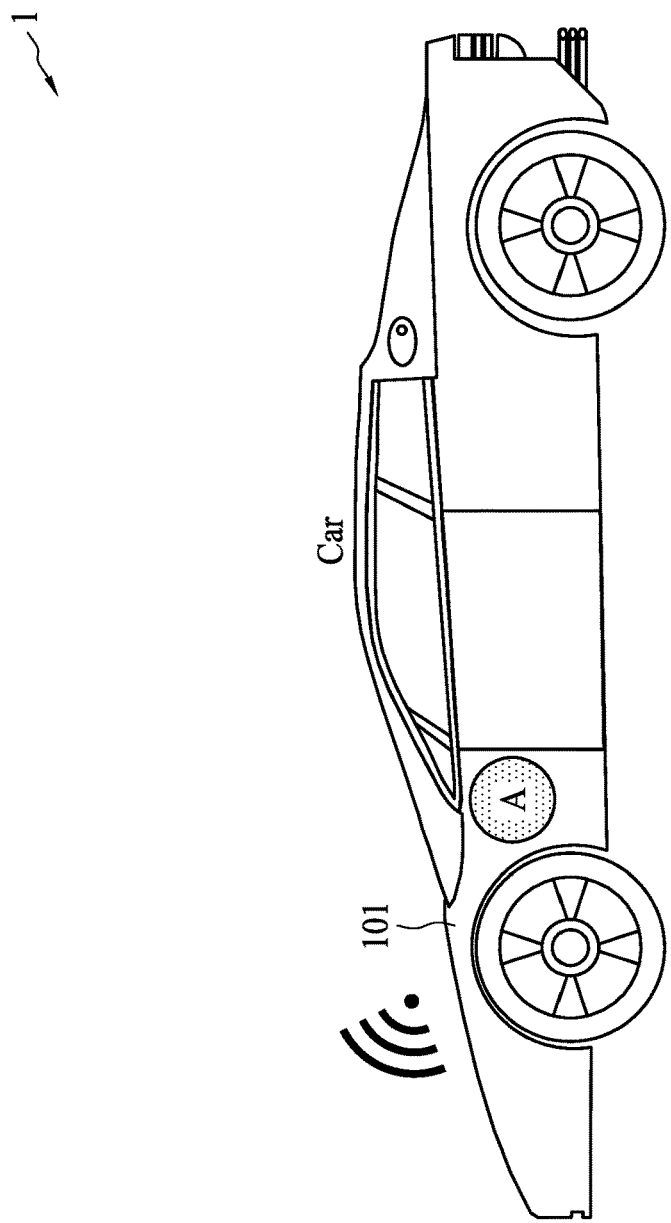
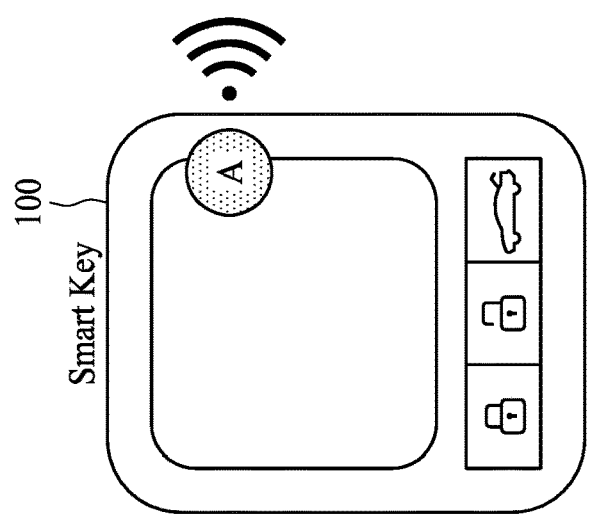
FIG. 1

COMMUNICATION SYSTEM

BACKGROUND

1. Technical Field

The present disclosure relates to a communication system and a method for operating the communication system, and more particularly to a system and a method for controlling a transmitting module and a receiving module of the communication system.

2. Description of the Related Art

A comparative wireless communication system includes a base station/gateway and the corresponding user equipment. The power consumption of the base station/gateway would be high, since the listening (receiving) mode of the base station/gateway is always on. A wireless communication system with long distance wireless communication and low power consumption is thus needed.

SUMMARY

In accordance with some embodiments of the present disclosure, a communication system includes a transmitting module. The transmitting module is configured to send at least one preamble to a receiver module operating alternatively in an idle mode or a transmission mode during a synchronization time period (Tsync). The synchronization time period (Tsync) is greater than an idle time period of the idle mode of the receiving module.

In accordance with some embodiments of the present disclosure, a communication system includes a receiving module. The receiving module including an idle mode and a transmission mode. The receiving module is configured to receive at least one preamble sent from a transmitting module within a synchronization time period (Tsync). The synchronization time period (Tsync) is greater than an idle time period of the idle mode.

In accordance with some embodiments of the present disclosure, a communication method includes operating a receiving module in an idle mode or a receiving mode; and receiving, by the receiving module, at least one of the preambles sent from a transmitting module within a synchronization time period (Tsync) in the receiving mode, wherein the synchronization time period (Tsync) is greater than an idle time period of the idle mode.

In accordance with some embodiments of the present disclosure, a communication system includes a transmitter and a receiver. The transmitter is arranged in remotely controllable functional key. The receiver is arranged in a vehicle. A communication between the transmitter and the receiver is operated by a half-duplex mechanism.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 1 illustrates a communication system in accordance with some embodiments of the present disclosure.

Figure 2:
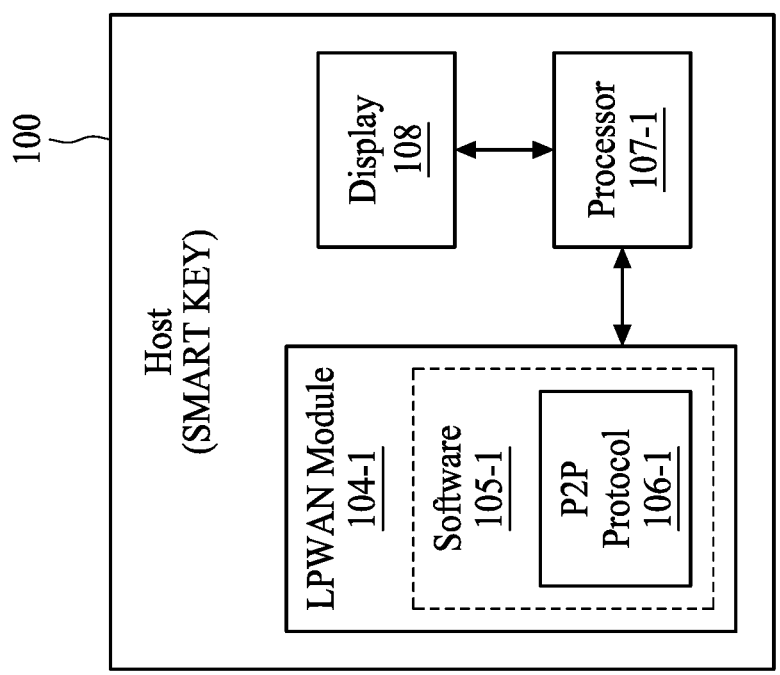
FIG. 2 illustrates a functional block diagram of a communication module in accordance with some embodiments of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

Various embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

According to at least some embodiments of the present disclosure, a synchronization time period (Tsync) is greater than an idle time period of the idle mode of a receiving module so that the receiving module may not always stay in the listening (receiving) mode. The synchronization time period (Tsync) is greater than or equal to a sum of the idle time period of the idle mode and an operating time period of the receiving (RX) mode of the receiving module. The idle time period of the idle mode is greater than an operating time period of the receiving (RX) mode of the receiving module. The preambles which include a plurality of continuous-transmitted preambles having a plurality of first preambles (W) and a second preamble (R) following the first preambles (W) may ensure the synchronization between the transmitting module and the receiving module. The preamble which includes a plurality of alternately-transmitted preambles may have the lower power consumption. The receiving module which is configured to receive at least two of the alternately-transmitted preambles within the operating time period of the receiving (RX) mode may reduce the hardware complexity, since the receiving (RX) time period may be reduced.

FIG. 1 illustrates a communication system 1 in accordance with some embodiments of the present disclosure. The communication system 1 includes communication modules 100 and 101. Each of the communication modules 100 and 101 has a transmitting module configured to transmit data or signal and a receiving module configured to receive data or signal. In some embodiments, the communication module 100 is arranged in a smart key and the communication 101 is arranged in a vehicle. In some embodiments, the com-munication mechanisms of the communication modules 100 and 101 are similar and corresponding to each other. In some embodiments, the communication module 100 is configured to, when activated, send at least one preamble to the communication module 101 to wake up the communication module 101. After the communication module 101 is woken up, the communication module 100 is configured to send data to the communication module 101 (e.g., opening the door of the vehicle or other actions for the vehicle). In some embodiments, the communication module 101 is configured to, when activated, send at least one preamble to the communication module 100 to wake up the communication module 100. In some embodiments, after the communication module 100 is woken up, the communication module 101 is configured to send data corresponding to information of the vehicle to the communication module 100 (e.g., if a burglar alarm in the vehicle has been triggered or other actions for the vehicle).

FIG. 2 illustrates a functional block diagram of a communication module 100 in accordance with some embodiments of the present disclosure. In some embodiments, the communication module 100 can be arranged in a smart key as shown in FIG. 1. In some embodiments, the communication module 100 includes functional components, such as, a Low-Power Wide-Area Network (LPWAN) module 104-1, a display 108 and a processor 107-1. In some embodiments, the LPWAN module 104-1 includes a software 105-1 installed thereon and a peer-to-peer (P2P) protocol 106-1. In some embodiments, the LPWAN module 104-1 may include a long range (LoRa) module, a Sigfox module, a long term evolution category-M (LTE Cat-M) module and/or a LTE narrowband-internet of things (LTE NB-IoT) module. The LPWAN module 104-1 and display 108 are controlled by the processor 107-1. The display 108 may display the information or states of the communication module 100.

Figure 3:
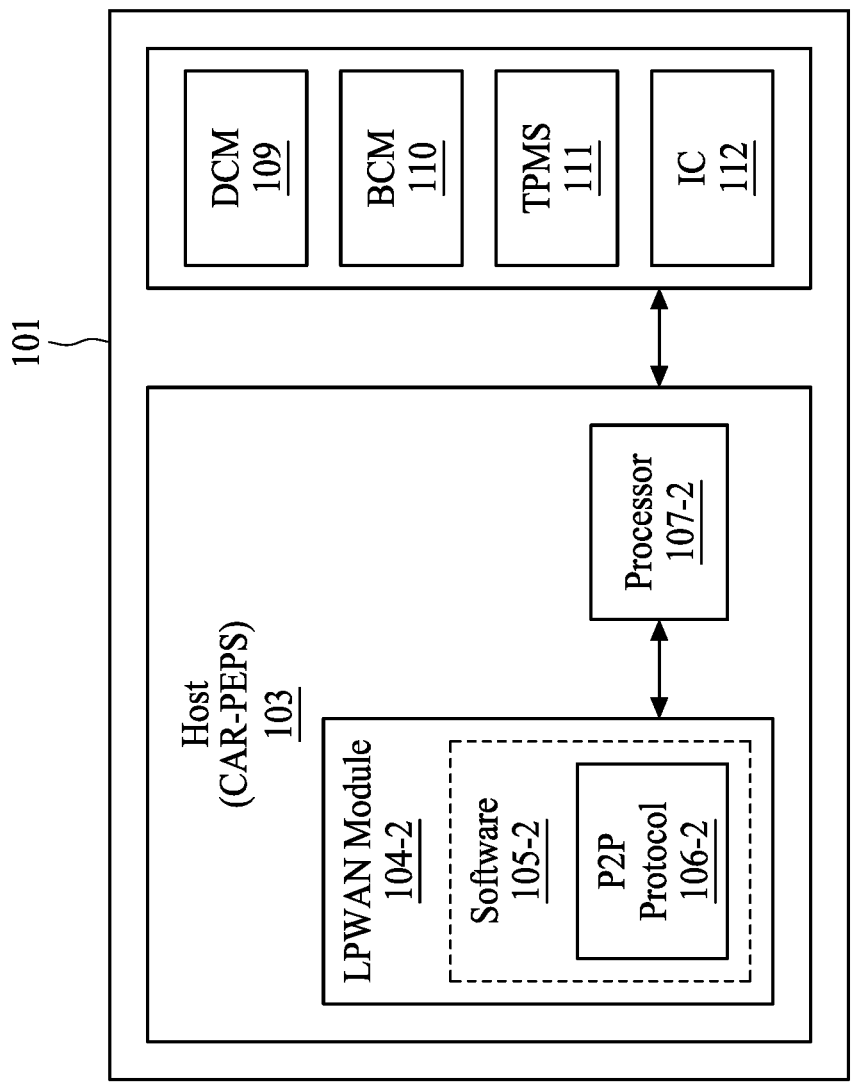
FIG. 3 illustrates a functional block diagram of a communication module in accordance with some embodiments of the present disclosure.

FIG. 3 illustrates a functional block diagram of a communication module 101 in accordance with some embodiments of the present disclosure. In some embodiments, the communication module 101 can be arranged in a vehicle as shown in FIG. 1. In some embodiments, the communication module 101 includes functional components, such as, a car keyless passive entry and passive start (PEPS) system 103, a data communication module (DCM) 109, a body control module (BCM) 110, a tire pressure monitoring system (TPMS) 111 and an integrated circuit (IC) 112. The PEPS system 103 includes a LPWAN module 104-2 and a processor 107-2. In some embodiments, the LPWAN module 104-2 includes a software 105-2 installed thereon and a P2P protocol 106-2. In some embodiments, the LPWAN module 104-2 may include a LoRa module, a Sigfox module, a LTE Cat-M module and/or a LTE NB-IoT module. The LPWAN module 104-2 is controlled by the processor 107-2. In some embodiments, the DCM 109, BCM 110, TPMS 111 and IC 112 may communicate with the processor 107-2.

Figure 4:
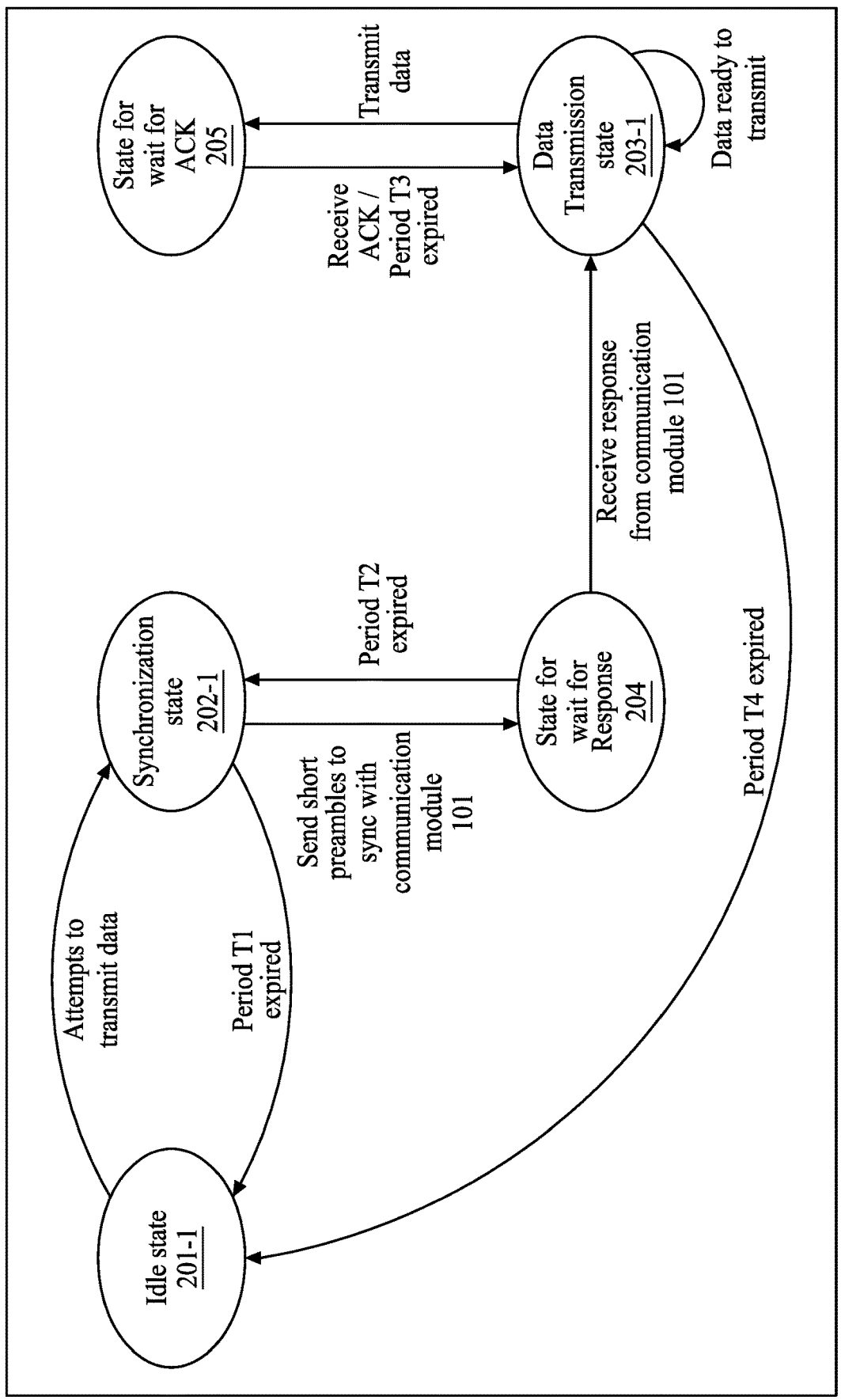
FIG. 4 illustrates a flow diagram showing a method for operating a communication module in accordance with some embodiments of the present disclosure.

FIG. 4 illustrates a flow diagram showing a method for operating a communication module in accordance with some embodiments of the present disclosure. In some embodiments, the communication module can be the communication module 100 as shown in FIG. 2. Alternatively, the communication module can be any other communication modules (e.g., the communication module 101) including LPWAN modules.

Figure 6:
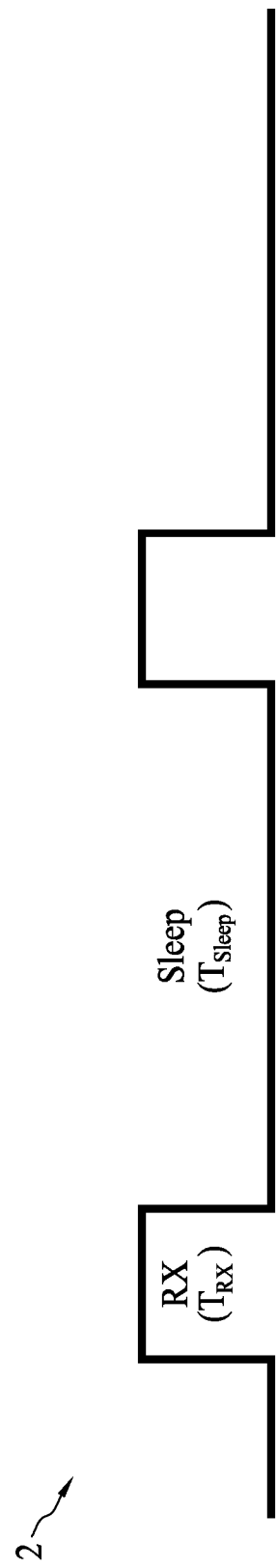
FIG. 6 illustrates a timing diagram of the LPWAN module in accordance with some embodiments of the present disclosure.

Referring to an idle state 201-1, the LPWAN module 104-1 in the communication module 100 of the LPWAN module 104-2 are in an idle mode and periodically woken up for synchronization. For example, as shown in FIG. 6, which illustrates a timing diagram of the LPWAN module 104-1 or 104-2, the LPWAN module 104-1 or 104-2 is periodically woken up (e.g., the signal at the relatively high level) for synchronization and then enter deep sleep (e.g., the signal at the relatively low level), which would reduce the power consumption of the LPWAN module 104-1 or 104-2.

When the transmitting module of the communication module 100 attempts to transmit the data to the communication module 101, the state of the communication module 100 is transferred or switched to a synchronization state 202-1. If no input has been inputted within a time period T1 of a timer, the communication module 100 is then switched to the state 201-1.

Referring to the state 202-1, the communication module 100 then sends short preambles (e.g., a synchronization signal) to the communication module 101 and tries to synchronize with the communication module 101. Then, the communication module 100 is switched to a state 204 for waiting for a response from the communication module 101. If no response is received from the communication module 101 within a time period T2 (e.g., a time period T2 of the timer for waiting for the response is expired), the communication module 100 will be switched to the state 202-1 from the state 204.

If the communication module 100 receives a response from the communication module 101 within the time period T2, the communication module 100 and communication module 101 are synchronized with each other. Then, the communication module 100 is switched to a state 203-1 (or data transmission state) for data transmission.

Referring to the state 203-1, the communication module 100 starts the data transmission between the communication module 100 and communication module 101. For example, the communication module 100 is configured to transmit data to the communication module 101.

After the communication module 100 transmits the data to the communication module 101, the communication module 100 is switched to a state 205 for waiting for an acknowledge (ACK) from the communication module 101. If no ACK is received from the communication module 101 within a time period T3 (e.g., a time period T3 of the timer for waiting for the ACK is expired) or the communication module 100 receives the ACK, the communication module 100 is switched to data transmission state 203-1.

If the communication module 100 starts another data transmission (e.g., the communication module 100 is ready to transmit another data to the communication module 101) within a time period T4, the communication module 100 is switched to the state 205 again. If no data has been transmitted within the time period T4 (e.g., a time period T4 of a timer for the data transmission is expired), the communication module 100 is switched to the state 201-1.

Figure 5:
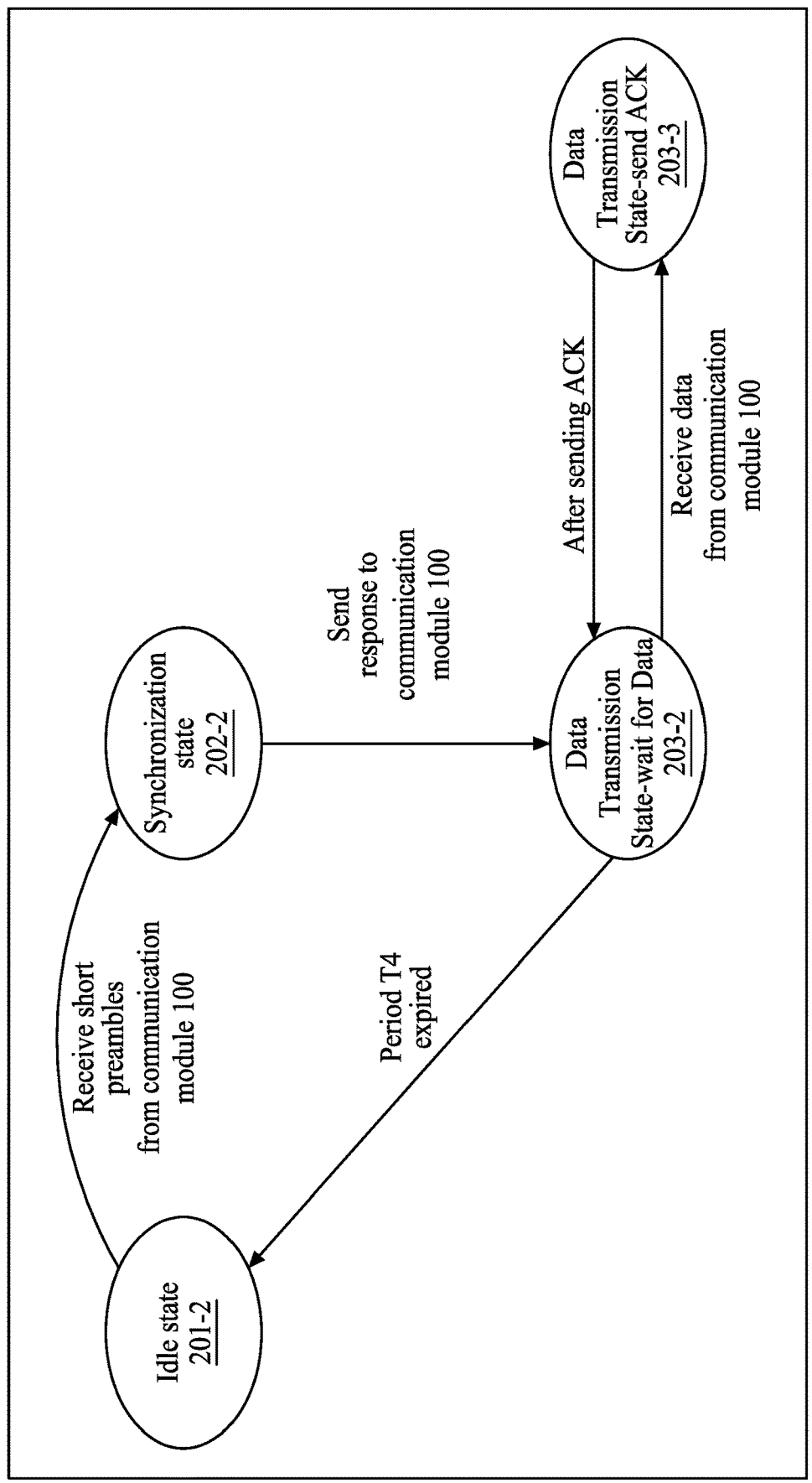
FIG. 5 illustrates a flow diagram showing a method for operating a communication module in accordance with some embodiments of the present disclosure.

FIG. 5 illustrates a flow diagram showing a method for operating a communication module in accordance with some embodiments of the present disclosure. In some embodiments, the communication module can be the communication module 101 as shown in FIG. 3. Alternatively, the communication module can be any other communication modules (e.g., the communication module 100) including LPWAN modules.

Referring to a state 201-2 (e.g., idle state), the LPWAN module 104-2 in the communication module 101 is in an idle mode and periodically woken up for synchronization.

When the communication module 101 receives the short preambles (e.g., a synchronization signal) from the communication module 100, the state of the communication module 101 is switched to a synchronization state 202-2. After the communication module 100 and communication module 101 are synchronized with each other, the communication module 101 sends the response to the communication module 100 and the communication module 101 is switched to a data transmission state 203-2 for waiting for the data. If no data is received by the communication module 101 within a time period T4 (e.g., the time period T4 of a timer for the data transmission is expired), the communication module 101 is switched to state 201-2.

If the communication module 101 receives the data from the communication module 100, the communication module 101 is switched to a data transmission state 203-3 for sending ACK. After the data has been received, the communication module 101 sends an ACK to the communication module 100 in the state 203-3. After sending ACK, the communication module 101 is switched to the data transmission state 203-2 for waiting for another data. The communication module 101 stays in the state 203-2 for waiting for another data transmission (another data). If the communication module 101 receives another data transmission within the time period T4 (e.g., before the time period T4 of a timer for the data transmission is expired), the communication module 101 will receive the data without re-starting another synchronization. If there is no another data is received by the communication module 101 within the time period T4 (e.g., the time period T5 of a timer for the data transmission is expired), the communication module 101 is switched to state 201-2.

Figure 7:
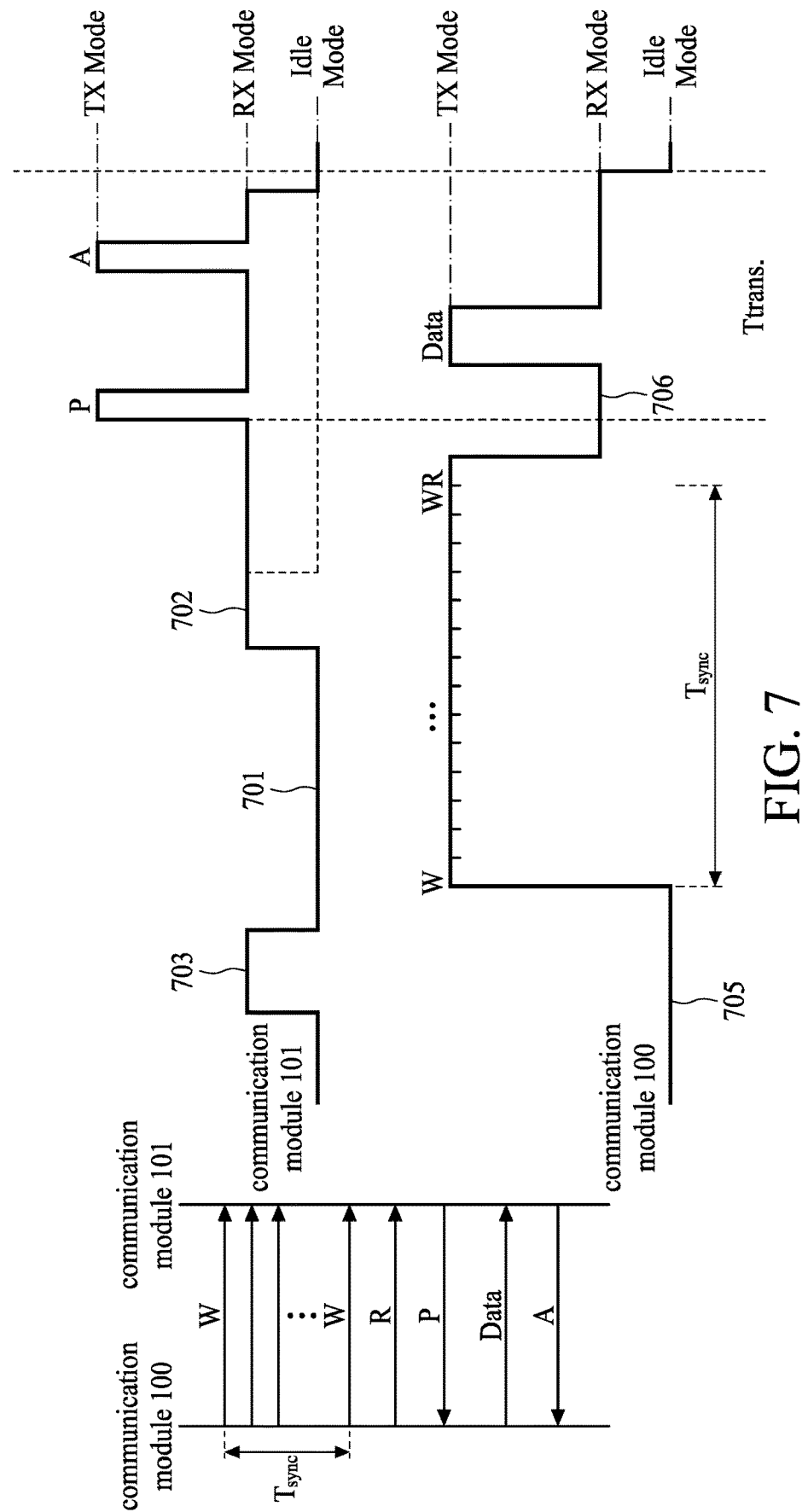
FIG. 7 illustrates a scheme for operating the communication module and communication module in accordance with some embodiments of the present disclosure.

FIG. 7 illustrates a scheme for operating the communication module 100 and communication module 101 in accordance with some embodiments of the present disclosure. As shown in FIG. 7, each of the communication modules 100 and 101 can be operated in an idle mode, a transmitting mode (TX mode) or a receiving mode (RX mode).

In an idle time period 705, the communication module 100 is operating in an idle mode while the communication 101 periodically switching between the idle mode (e.g., time period 701) and the RX mode (e.g., time period 703). To synchronize the communication modules 100 and 101, the communication module 100 is configured to send one or more preambles to the communication module 101 that is configured to operate alternatively in the idle mode (e.g., time period 701) or the RX mode, (e.g., time period 702) during a synchronization time period Tsync. In some embodiments, the preamble includes a plurality of continuously-transmitted preambles having a plurality of first preambles W and a second preamble R following the first preambles W. In some embodiments, the synchronization time period Tsync is greater than the period 701 of the idle mode of the communication module 101 to ensure that the communication module 101 can receive the preambles during the synchronization time period Tsync. In some embodiments, the synchronization time period Tsync is greater than or equal to a sum of the idle time period of the idle mode and the time period 703 of the RX mode of the communication module 101.

When the communication module 101 receives the preamble W from the communication module 100, the communication module 101 stays in the RX mode. After the communication module 101 receives the preamble R from the communication module 100, the communication module 101 is switched from the RX mode to the TX mode to send a response P to the communication module 100. After the communication module 100 sends out the preamble R, the communication module 100 is switched from the TX mode to the RX mode to wait for the response P from the communication module 101 in a time period 706. In some embodiments, the time period 706 is less than the time period (e.g., Tsync) of the TX mode of the transmission module 100. Once the communication module 100 receives the response P from the communication module 101, the communication module 100 is switched to the TX mode from the RX mode and is configured to send data to the communication module 101 during the data transmission period Ttrans.

After the communication module 101 receives the data from the communication module 100, the communication module 101 is switched from the RX mode to the TX mode to send an acknowledge A to the communication module 100. After the communication module 100 sends out the data, the communication module 100 is switched to the RX mode from the TX mode to receive the acknowledge A. The communication module 101 is then switched from the TX mode to the RX mode after sending the ACK. If there is no additional data received from the communication module 100, the communication module 101 is switched from the RX mode to the idle mode.

In some embodiments, the communication module 100 is arranged in remotely controllable functional key (e.g., smart key) and the communication module 101 is arranged in a vehicle. A communication between the communication module 100 and the communication module 101 is operated by a half-duplex mechanism and the communication includes the P2P communication. In some embodiments, the communication module 100 includes the LPWAN module 104-1 and the communication module 101 includes the LPWAN module 104-2. The LPWAN modules 104-1 and 104-2 include one of LoRa, Sigfox, LTE Cat-M and LTE NB-IoT protocols.

Figure 8:
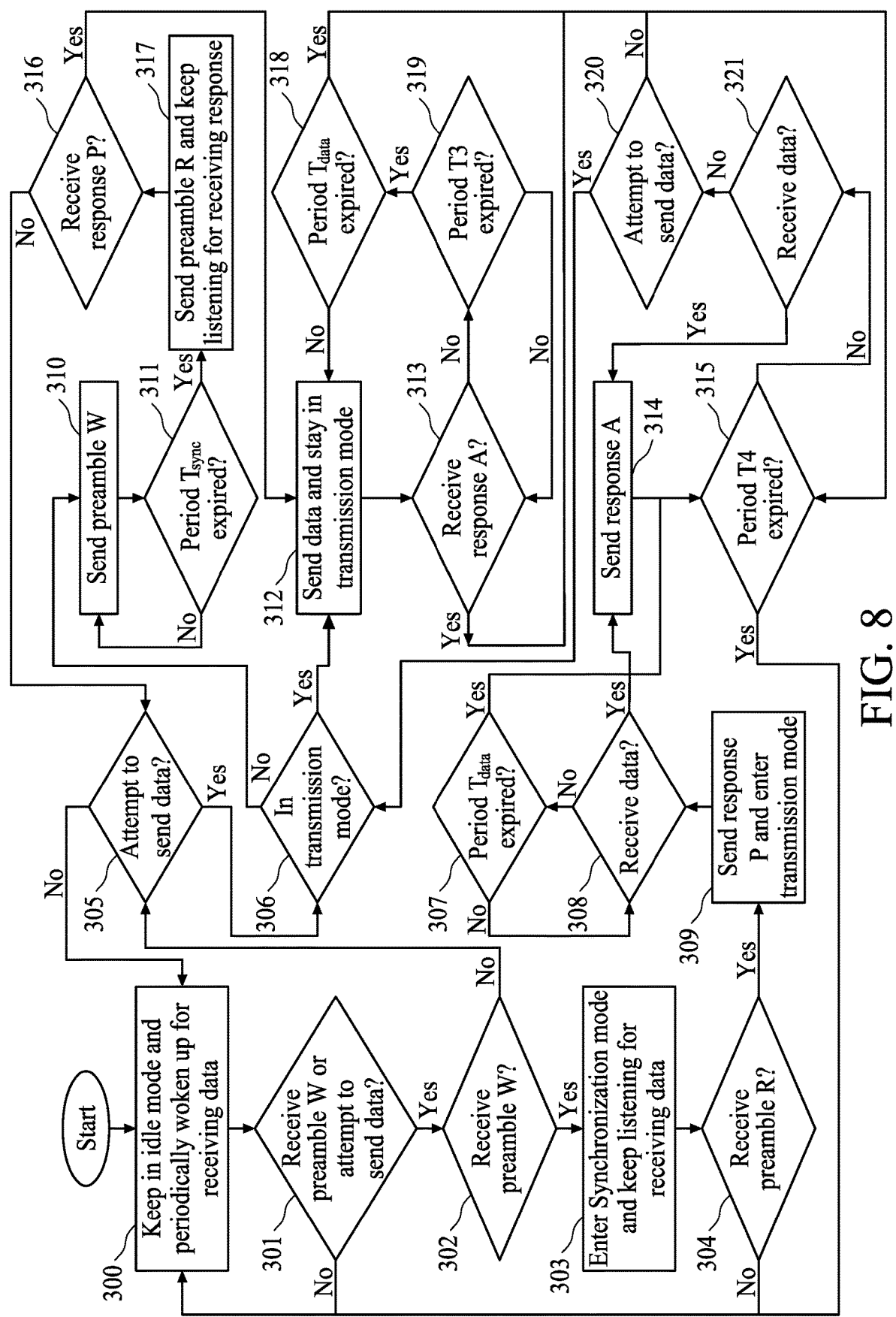
FIG. 8 illustrates a flow diagram showing a method for operating the communication module and communication module of FIG. 7 in accordance with some embodiments of the present disclosure.

FIG. 8 illustrates a flow diagram showing a method for operating the communication module 100 and communication module 101 of FIG. 7 in accordance with some embodiments of the present disclosure.

Referring to the operation 300, the communication module 101 is operated in the idle mode and periodically woken up for receiving the data from the communication module 100 and the communication module 100 is operated in the idle mode and periodically woken up for receiving the data from the communication module 101.

Referring to the operation 301, if the communication module 101 receives the preambles W or the communication module 100 attempts to send data, or vice versa (e.g., if the communication module 100 receives the preambles W or the communication module 101 attempts to send data), the operation 301 is switched to the operation 302. If no preamble is received or no data is required to be transmitted, the operation 301 is returned to the operation 300.

The following embodiments are directed to the communication module 100 operated as a data sender and the communication module 101 operated as a data receiver. In some embodiments, if the communication module 100 is operated as a data receiver and the communication module 101 is operated as a data sender, the flow diagram is also applicable.

Referring to the operation 302, if the communication module 101 receives the preambles W, the communication module 101 enters a synchronization mode and keeps listening for receiving the data at the operation 303. If no preamble W is received, the operation 302 is switched to the operation 305 to check whether any data is required to be transmitted (e.g., attempting to send the data).

Referring to the operation 304, if the communication module 101 receives the preamble R from the communication module 100, the communication module 101 sends a response (or preamble) P to the communication module 100 and is switched to a transmission mode at the operation 309. If no preamble R is received by the communication module 101, the operation 304 is switched to the operation 300.

Referring to the operation 308, the communication module 101 tries to receive data from the communication module 100. If the communication module 101 receives the data from the communication module 100, the communication module 101 sends an ACK to the communication module 100 to inform the communication module 100 that the data is successfully received as shown in the operation 314. If no data has been received by the communication module 101, the timer of the communication module 101 checks whether a predetermined time period $T_{data}$ (the period after sending a response (or preamble) P and before receiving any portion of the data) is expired at the operation 307. If the time period $T_{data}$ has not been expired, the communication module 101 is configured to keep trying to receive the data from the communication module 100. If the time period $T_{data}$ is expired, the timer checks whether a period T4 of the timer for the data transmission is expired at the operation 315 (or whether the period of the transmission mode is expired).

Referring to the operation 315, if the period T4 for the data transmission is expired, the operation is switched to the operation 300. If the period T4 is not expired, the operation 315 is switched to operation 321. The communication module 100 and communication module 101 can directly perform the communication without a re-actuated synchronization if the time period T4 is not expired at operation 315.

Referring to the operation 321, the communication module 101 is configured to try to receive another or additional data. If the additional data has been received by the communication module 101, the communication module 101 sends an ACK to the communication module 100 at operation 314. If no addition data has been received, the operation is switched to the operation 320 to check whether the communication module 100 attempts to send data. If the communication module 100 does not attempt to send data, the timer checks whether the period T4 is expired as shown in the operation 315. If the communication module 100 attempts to send data, the operation 320 is switched to the operation 306.

Referring to the operation 306, the communication module 100 checks whether it is in the transmission mode. If the communication module 100 is in the transmission mode, the communication module 100 is configured to send data and to stay in the transmission mode. If the communication module 100 is not in the transmission mode, the communication module 100 is configured to send the preamble W to synchronize with the communication module 101 as shown in the operation 310.

Referring to the operation 311, the timer checks whether the period $T_{sync}$ for synchronization has been expired. If the period $T_{sync}$ has not been expired, the communication module 100 keeps sending preamble W. If the period $T_{sync}$ has been expired, the communication module 100 sends preamble R and keeps listening for receiving the response as shown at the operation 317.

Referring to the operation 316, the communication module 100 checks whether the response P has been received. If the response P has not been received, the communication module 100 checks whether it attempts to send data as shown in the operation 305. If the response P has been received, the communication module 100 is configured to send data and keep in the transmission mode as shown in the operation 312.

Referring to the operation 313, the communication module 100 is configured to check whether an ACK has been received from the communication module 101. If the communication module 100 does not receive the ACK, the timer checks whether a time period T3 for waiting for the ACK is expired at operation 319. If the time period T3 is expired, the timer checks whether the time period $T_{data}$ is expired at operation 318. If the time period $T_{data}$ is expired at operation 318, the operation is switched to the operation 315. If the time period $T_{data}$ is not expired at operation 318, the communication module 100 sends the data and stays in the transmission mode at operation 312.

Figure 9:
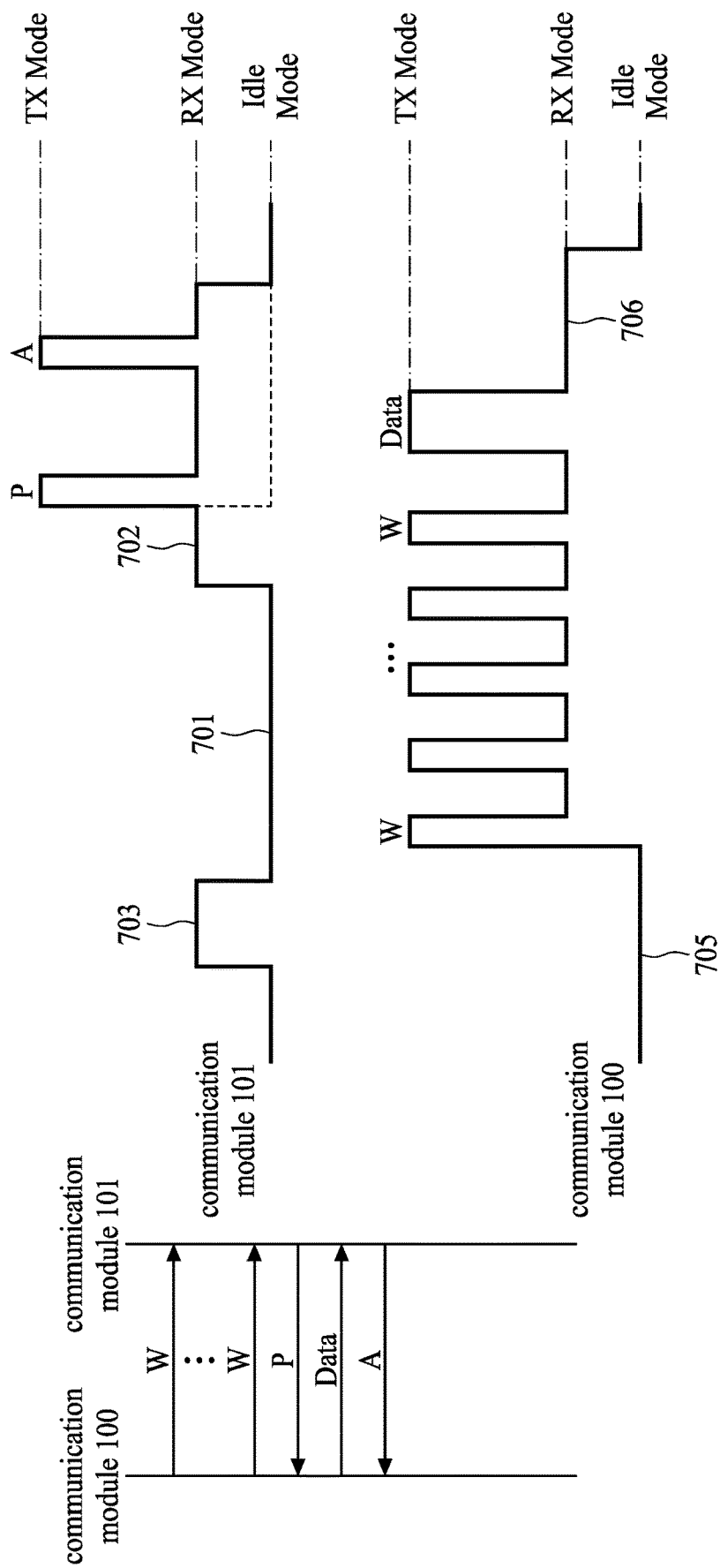
FIG. 9 illustrates an operation scheme for operating the communication module and communication module in accordance with some embodiments of the present disclosure.

FIG. 9 illustrates an operation scheme for operating the communication module 100 and communication module 101 in accordance with some embodiments of the present disclosure. The operation scheme in FIG. 9 is similar in that of FIG. 7, and one of the differences therebetween is that the preambles illustrated in FIG. 7 are in form of a continuous waveform with a constant level while the preambles illustrated in FIG. 9 includes a plurality of preambles with a relatively high level and a relatively low level.

Referring to FIG. 9, the preamble includes a plurality of alternately-transmitted preambles W. The operating time period 703 of the RX mode of the communication module 101 is greater than a time period of at least one preamble W of the plurality of alternately-transmitted preambles.

The communication module 101 is configured to receive at least one of the alternately-transmitted preambles within the operating period 702 of the RX mode of the communication module 101. After the communication module 101 receives one preamble W from the communication module 100, the communication module 101 is switched from the RX mode to the TX mode to send a response P to the communication module 100.

Figure 10:
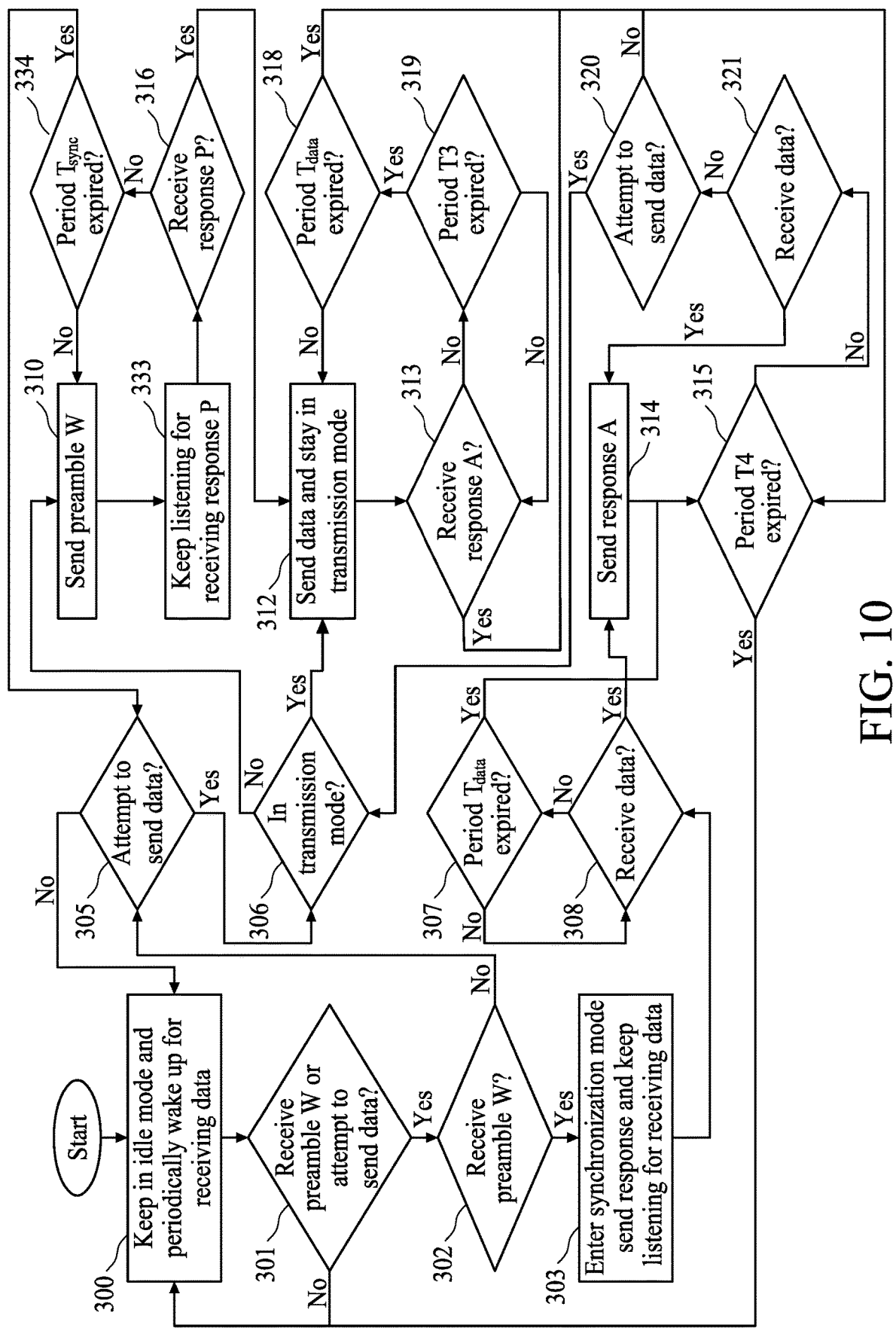
FIG. 10 illustrates a flow diagram showing a method for operating the communication module and communication module of FIG. 9 in accordance with some embodiments of the present disclosure.

FIG. 10 illustrates a flow diagram showing a method for operating the communication module 100 and communication module 101 of FIG. 9 in accordance with some embodiments of the present disclosure. The flow diagram in FIG. 10 is similar to that of FIG. 8, and one of the differences therebetween is that in FIG. 10, the operations 304 and 317 illustrated in FIG. 8 are omitted and the operations 333 and 334 are added.

Referring to the operation 302, if the communication module 101 receives the preambles W, the communication module 101 enters a synchronization mode, sends the response P and keeps listening for receiving the data at the operation 303. The plurality of preambles with a relatively high level and a relatively low level sent by the communication module 100 do not include the preamble R as shown in FIG. 8.

Referring to the operation 308, the communication module 101 tries to receive data from the communication module 100. If the communication module 101 receives the data from the communication module 100, the communication module 101 sends an ACK to the communication module 100 to inform the communication module 100 that the data is successfully received as shown in the operation 314. If no data has been received by the communication module 101, the timer of the communication module 101 checks whether a predetermined time period $T_{data}$ is expired at the operation 307. If the time period $T_{data}$ has not been expired, the communication module 101 is configured to keep trying to receive the data from the communication module 100. If the time period $T_{data}$ is expired, the timer checks whether a period T4 of the timer for the data transmission is expired at the operation 315 (or whether the period of the transmission mode is expired).

Referring to the operation 310, the communication module 100 is configured to send the preamble W to synchronize with the communication module 101. After the communication module 101 receives the preambles W, the communication module 101 enters a synchronization mode and keeps listening for receiving the data at the operation 333. The plurality of preambles sent by the communication module 100 do not include the preamble R.

Referring to the operation 316, the communication module 100 checks whether the response P has been received. If the response P has not been received, the timer checks whether the period $T_{sync}$ for synchronization has been expired as shown in the operation 334. If the period $T_{sync}$ for synchronization has been expired at the operation 334, the communication module 100 checks whether it attempts to send data as shown in the operation 305. If the period $T_{sync}$ for synchronization is not expired as shown in the operation 334, the communication module 100 will keep sending the preamble W and stays in the transmission mode at operation 310.

Figure 11:
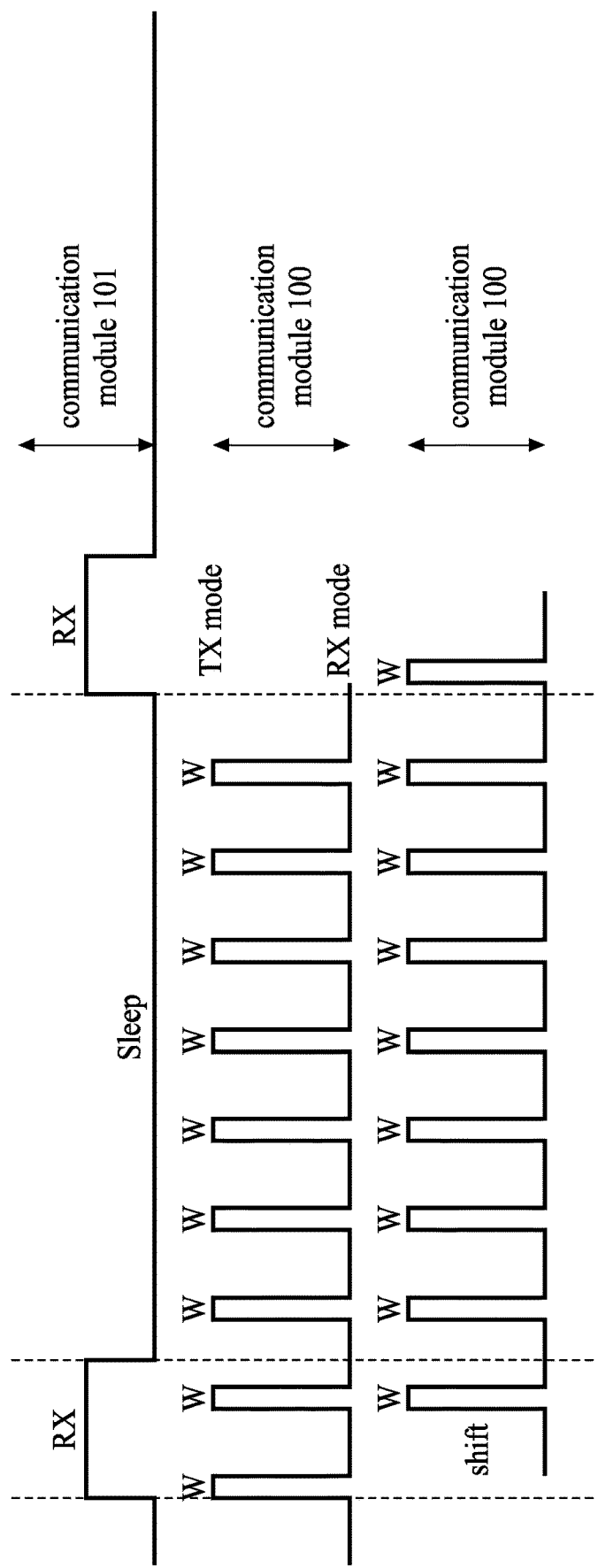
FIG. 11 illustrates the operation of an idle mode of the communication module and the communication module.

FIG. 11 illustrates the operation of an idle mode of the communication module 100 and the communication module 101. The communication module 101 is periodically woken up for synchronization and switched to the idle mode. In some embodiments, the communication module 101 is configured to receive at least two of the alternately-transmitted preambles within the operating time period of the receiving RX mode of the communication module 101. The communication module 101 may be synchronized with the communication module 100 after receive two of the alternately-transmitted preambles.

Figure 12:
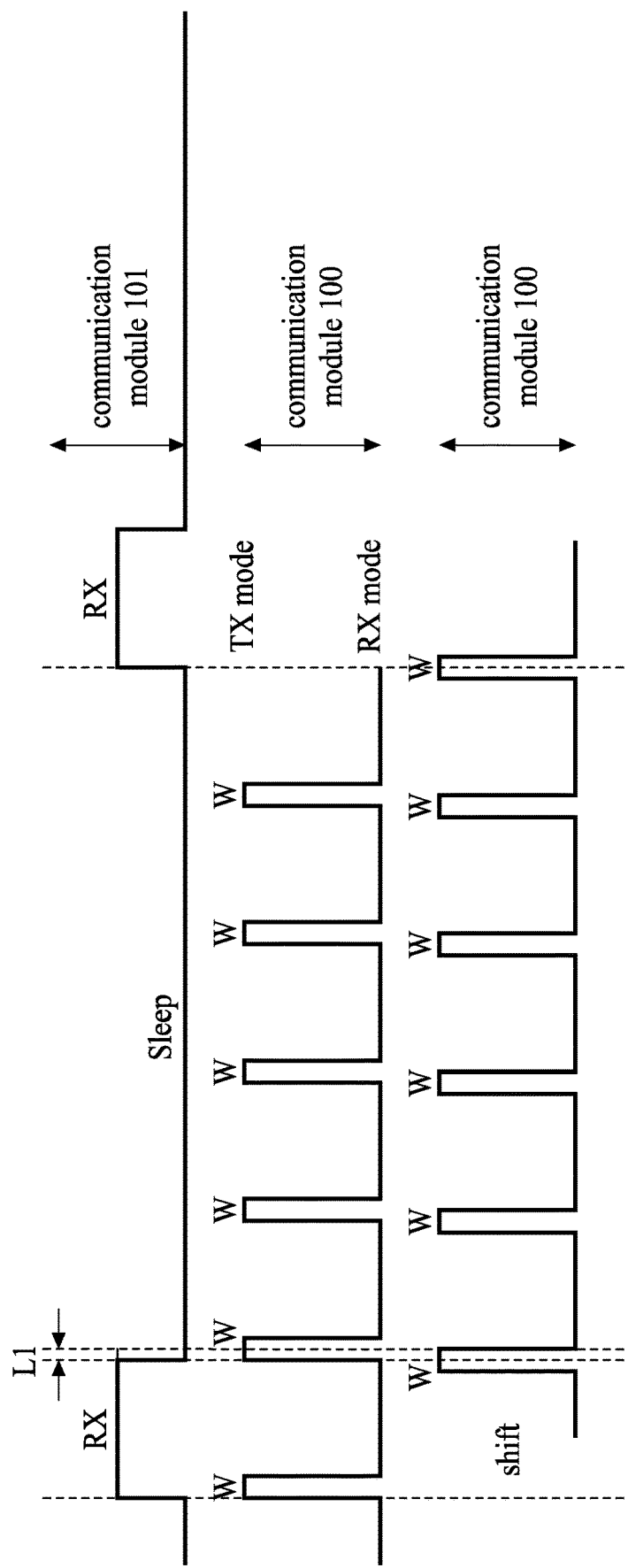
FIG. 12 illustrates the operation of an idle mode of the communication module and the communication module.

FIG. 12 illustrates the operation of an idle mode of the communication module 100 and the communication module 101. The communication module 101 is periodically woken up for synchronization and switched to the idle mode. In some embodiments, the communication module 101 is configured to receive at least one of the alternately-transmitted preambles within the operating time period of the receiving RX mode. As shown in FIG. 12, even if the preamble W has a shift L1 at the time period, the communication module 101 may receive a portion of at least one of the alternately-transmitted preambles within the operating time period of the receiving RX mode. The communication module 101 will not be switched to the sleep mode (idle mode), if the communication module 101 receives a portion of at least one of the alternately-transmitted preambles. The communication module 101 may be synchronized with the communication module 100 after the communication module 101 receives one completer preamble of the alternately-transmitted preambles.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

Amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

Some embodiments of this disclosure relate to a non-transitory computer-readable storage medium having computer code or instructions thereon for performing various computer-implemented operations. The term "computer-readable storage medium" is used to include any medium that is capable of storing or encoding a sequence of instructions or computer code for performing the operations, methodologies, and techniques described herein. The media and computer code may be those specially designed and constructed for the purposes of the embodiments of the disclosure, or they may be of the kind available to those having skill in the computer software arts. Examples of computer code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Another embodiment of the disclosure may be implemented in hardwired circuitry in place of, or in combination with, processor-executable software instructions.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A communication system, comprising:
a transmitting circuit configured to send at least one preamble to a receiving circuit operating alternatively in an idle mode or a transmission mode during a synchronization time period;
wherein the synchronization time period is greater than an idle time period of the idle mode of the receiving circuit.

2. The communication system of claim 1, wherein the transmitting circuit includes a transmission mode having a transmitting mode for sending the preamble and a receiving mode, the transmitting mode of the transmitting circuit is switched to the receiving mode to receive a response from the receiving circuit after sending the preamble.

3. The communication system of claim 2, wherein the transmitting circuit is switched to the transmitting mode from the receiving mode after receiving the response and wherein the transmitting circuit is configured to send data to the receiving circuit after receiving the response.

4. The communication system of claim 3, wherein the transmitting circuit is switched to the receiving mode from the transmitting mode after sending the data and is configured to receive an acknowledge from the receiving circuit in response to the receipt of the data.

5. The communication system of claim 2, wherein the preamble includes a plurality of continuously-transmitted preambles having a plurality of first preambles and a second preamble following the first preambles, the receiving circuit is configured to keep operating in a receiving mode after receiving the first preambles, and the receiving circuit is configured to send the response after receiving the second preamble.

6. The communication system of claim 5, wherein the transmitting circuit is configured to receive the response after sending the second preamble.

7. The communication system of claim 2, wherein the preamble includes a plurality of alternately-transmitted preambles sent in the transmitting mode.

8. The communication system of claim 7, wherein an operating time period of the receiving mode of the transmitting circuit is greater than an operating time period of a transmitting mode of the transmission mode of the receiving circuit.

9. The communication system of claim 5, wherein the second preamble is different from each of the plurality of first preambles.

10. The communication system of claim 1, wherein the transmitting circuit further includes a first peer-to-peer (P2P) protocol, wherein the receiving circuit is movable and further includes a second peer-to-peer (P2P) protocol, and wherein the communication between the transmitting circuit and the receiving circuit includes a peer-to-peer communication.

11. The communication system of claim 1, wherein when the transmitting circuit is configured to operate in a transmitting mode for sending data, the receiving circuit is configured to operate in a receiving mode, and wherein when the receiving circuit is configured to operate in a transmitting mode for sending an acknowledge or a response, the transmitting circuit is configured to operate in a receiving mode.

12. A communication system, comprising:
a receiving circuit including an idle mode, the receiving circuit configured to receive at least one preamble sent from a transmitting circuit within a synchronization time period;
wherein the synchronization time period is greater than an idle time period of the idle mode, wherein the synchronization time period is greater than or equal to a sum of the idle time period of the idle mode and an operating time period of a receiving mode of the receiving circuit.

13. The communication system of claim 12, wherein the receiving circuit further includes a transmission mode, wherein the transmission mode further includes a receiving mode, the idle time period of the idle mode is greater than an operating time period of a receiving mode of the receiving circuit.

14. The communication system of claim 12, wherein the receiving circuit further includes a transmission mode, wherein the transmission mode further includes a transmitting mode, the receiving circuit configured to send a response after receiving at least one preamble.

15. The communication system of claim 13, wherein the preamble includes a plurality of alternately-transmitted preambles, wherein the operating time period of the receiving mode of the receiving circuit is greater than a time period of at least one of the plurality of alternately-transmitted preambles.

16. The communication system of claim 15, wherein the receiving circuit is configured to receive at least one of the alternately-transmitted preambles within the operating period of the receiving mode.

17. The communication system of claim 15, wherein the receiving circuit is configured to receive at least two of the alternately-transmitted preambles within the operating time period of the receiving mode.

18. A communication method, comprising:
operating a receiving circuit in an idle mode or a receiving mode; and
receiving, by the receiving circuit, at least one of the preambles sent from a transmitting circuit within a synchronization time period in the receiving mode, wherein the synchronization time period is greater than an idle time period of the idle mode, wherein if no preamble is received during a synchronization time period, the receiving circuit is switched from the receiving mode to the idle mode.

19. The method of claim 18, further comprising:
switching the transmitting circuit from a transmitting mode to a receiving mode after the synchronization time period;
switching the receiving circuit from the receiving mode to a transmitting mode after receiving at least one of the preambles.

20. The method of claim 19, further comprising:
sending a response from the receiving circuit in the transmitting mode to the transmitting circuit; and
switching the receiving circuit from the transmitting mode to the receiving mode after sending the response.

21. The method of claim 20, further comprising:
receiving the response by the transmitting circuit in the receiving mode; and
switching the transmitting circuit from the receiving mode to the transmitting mode after receiving the response.

22. The method of claim 21, further comprising:
sending data by the transmitting circuit to the receiving circuit;
switching the transmitting circuit from the transmitting mode to the receiving mode;
receiving the data by the receiving circuit in the receiving mode.

23. The method of claim 22, further comprising:
switching the receiving circuit from the receiving mode to the transmitting mode;
sending an acknowledge from the receiving circuit to the transmitting circuit; and
switching the receiving circuit from the transmitting mode to the receiving mode.

24. The method of claim 23, further comprising:
receiving the acknowledge by the transmitting circuit in the receiving mode; and
switching the transmitting circuit from the receiving mode to an idle mode.

25. The method of claim 18, further comprising:
sending at least one first preamble of the preambles by the transmitting circuit in a transmitting mode;
receiving the at least one first preamble by the receiving circuit staying in the receiving mode;
sending a second preamble following the at least one first preamble by the transmitting circuit in the transmitting mode; and
switching the transmitting circuit from the transmitting mode to the receiving mode;
receiving the second preamble by the receiving circuit in the receiving mode; and
switching the receiving circuit from the receiving mode to the transmitting mode.

26. A communication system, comprising:
a transmitter arranged in remotely controllable functional key, wherein the transmitter further includes an idle mode, a transmitting mode and a receiving mode; and
a receiver arranged in a vehicle, wherein the receiver further includes an idle mode, a transmitting mode and a receiving mode, wherein when the transmitter is configured to operate in a transmitting mode for sending data, the receiver is configured to operate in a receiving mode, and wherein when the receiver is configured to operate in a transmitting mode for sending an acknowledge or a response, the transmitter is configured to operate in a receiving mode;
wherein a communication between the transmitter and the receiver is operated by a half-duplex mechanism;
wherein the receiver includes a transmission mode;
wherein the transmitter is configured to send at least one preamble during a synchronization time period, and the receiver is configured to receive the at least one preamble on the transmission mode within the synchronization time period; and
wherein the synchronization time period is greater than an idle time period of the idle mode.

* * * * *